(12) United States Patent
Tarr

(10) Patent No.: US 9,258,869 B2
(45) Date of Patent: Feb. 9, 2016

(54) TRAILER TAIL LIGHT ADAPTER/CONVERTER

(71) Applicant: Charles E. Tarr, Brooksville, ME (US)

(72) Inventor: Charles E. Tarr, Brooksville, ME (US)

( * ) Notice: Subject to any disclaimer, the term of this patent is extended or adjusted under 35 U.S.C. 154(b) by 70 days.

(21) Appl. No.: 14/165,250

(22) Filed: Jan. 27, 2014

(65) Prior Publication Data

US 2015/0216013 A1    Jul. 30, 2015

(51) Int. Cl.
*G08B 21/00* (2006.01)
*H01R 24/00* (2011.01)
*H01R 25/00* (2006.01)
*B60Q 1/14* (2006.01)
*B60Q 1/26* (2006.01)
*B60Q 1/02* (2006.01)
*H05B 37/02* (2006.01)
*B60D 1/00* (2006.01)
*B60R 9/06* (2006.01)

(52) U.S. Cl.
CPC .......... *H05B 37/02* (2013.01); *B60D 2001/005* (2013.01); *B60R 9/06* (2013.01)

(58) Field of Classification Search
CPC ...... B60Q 1/305; B60Q 2900/30; B60Q 1/38; B60Q 1/44; B60Q 11/007; B60Q 1/0088; B60Q 1/302; B60Q 1/46; B60Q 1/52; B60R 16/03; G07C 5/0825; B60D 1/64–1/66
See application file for complete search history.

(56) References Cited

U.S. PATENT DOCUMENTS

| | | | | | |
|---|---|---|---|---|---|
| 3,849,664 | A | * | 11/1974 | Bryant | 315/77 |
| 3,970,860 | A | * | 7/1976 | Purdy | 340/477 |
| 4,005,313 | A | | 1/1977 | Tibbits | |
| 4,287,503 | A | * | 9/1981 | Sumida | 340/461 |
| 4,682,146 | A | * | 7/1987 | Friedman, III | 340/468 |
| 5,018,799 | A | * | 5/1991 | Rutledge, Jr. | 303/118.1 |
| 5,030,938 | A | * | 7/1991 | Bondzeit | 340/431 |
| 5,354,204 | A | * | 10/1994 | Hughes | 439/35 |
| 5,389,823 | A | * | 2/1995 | Hopkins et al. | 307/10.1 |
| 5,498,929 | A | * | 3/1996 | Formwalt, Jr. | 315/77 |
| 5,521,466 | A | * | 5/1996 | Vincent | 315/77 |
| 5,701,116 | A | | 12/1997 | Hoekstra | |
| 6,232,722 | B1 | * | 5/2001 | Bryant et al. | 315/80 |
| 6,714,128 | B2 | | 3/2004 | Abbe et al. | |
| 6,909,363 | B2 | * | 6/2005 | Bell et al. | 340/431 |
| 7,342,487 | B2 | * | 3/2008 | Del Estal Villar | 340/471 |
| 7,425,088 | B2 | | 9/2008 | Weitzel | |
| 8,061,881 | B2 | | 11/2011 | Weitzel | |
| 8,129,909 | B1 | * | 3/2012 | Hoekstra | 315/82 |
| 8,179,142 | B2 | | 5/2012 | Kulkarni et al. | |
| 8,258,703 | B1 | * | 9/2012 | Hoekstra | 315/77 |
| 8,496,485 | B2 | * | 7/2013 | Workman | 439/35 |
| 8,525,659 | B2 | * | 9/2013 | Lin et al. | 340/471 |
| 8,588,997 | B2 | * | 11/2013 | Pribula et al. | 701/9 |
| 2003/0222776 | A1 | * | 12/2003 | Wakabayashi et al. | 340/468 |

OTHER PUBLICATIONS

Author: www.digplanet.com, Title: NAND Gates, Captured Date: Sep. 3, 2015, Pertinent Pages: Entire Document.*

* cited by examiner

*Primary Examiner* — Fekadeselassie Girma
*Assistant Examiner* — Muhammad Adnan
(74) *Attorney, Agent, or Firm* — Anthony D. Pellegrini, Esq.

(57) ABSTRACT

An electrical adapter configured to allow a towing vehicle's standard six wire electrical output connection to be used with a trailer's standard four wire electrical input connection, with the adapter combining electrical signals from the towing vehicle by use of a pair of logic circuits in a manner that results in the trailer's tail lights displaying all desired signals, including simultaneous braking and turning signals, and a converter configured to allow a towing vehicle's standard four wire electrical output connection to be used with a trailer's standard four wire electrical input connection, with the converter combining electrical signals from the towing vehicle by use of a pair of logic circuits in a manner that results in the trailer's tail lights displaying all desired signals, including simultaneous braking and turning signals.

14 Claims, 6 Drawing Sheets

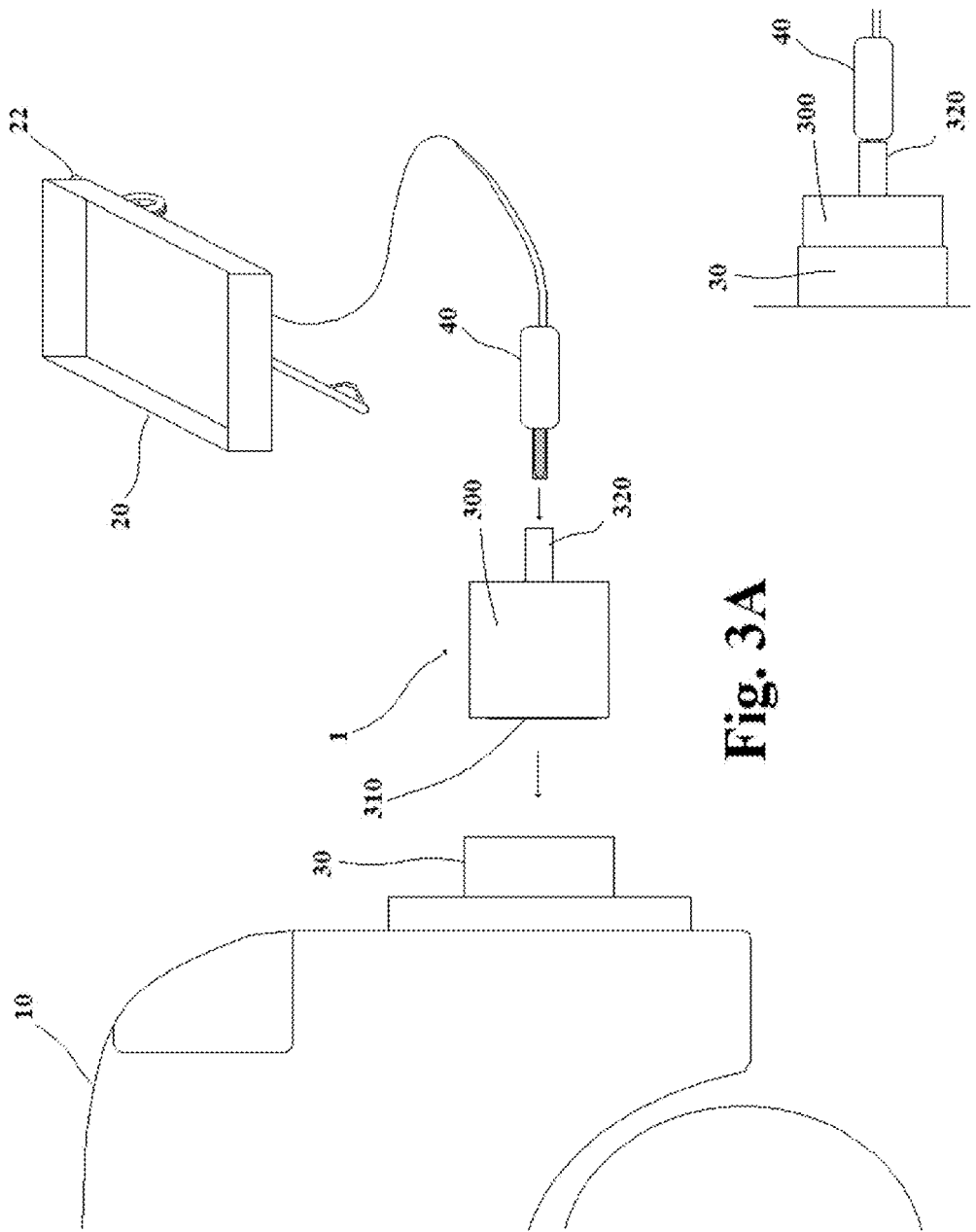

TRAILER TAIL LIGHT ADAPTER/CONVERTER

BACKGROUND OF THE INVENTION

1. Technical Field

The present invention relates generally to automotive electrical accessories. More particularly, the present invention relates to a device for allowing a vehicle having either a standard four wire electrical output connection or a standard six wire electrical output connection to be able to control the tail lights of a trailer having a standard four wire electrical input connection.

2. Description of Prior Art

Light utility trailers capable of being towed by passenger vehicles and light trucks come equipped with tail lights to indicate to following vehicles whether the towing vehicle has applied its brakes or has signaled a left or right turn. Most vehicles capable of towing such a trailer have as standard equipment an electrical output connection that can be connected to an electrical input connection integrated with a cord wired to the trailer's tail lights, and those that do not have such a connection can have one installed as an after-market accessory. The electrical output connection typically found on a towing vehicle may be a standard four wire electrical output connection having a ground wire, a wire dedicated to running lights, a left signal wire, and a right signal wire. This is a typical configuration of a vehicle intended to tow a small utility trailer. The electrical output connection typically found on a towing vehicle also may be a standard six wire electrical output connection, having a power wire, a ground wire, a wire dedicated to running lights, a brake wire, a left signal wire, and a right signal wire. This is a typical configuration of a vehicle intended to tow a recreational vehicle. However, as more and more vehicles come equipped with the standard six wire electrical output connection, there is a mismatch in use with light utility trailers. When the towing vehicle's electrical output connection does not match the trailer's electrical input connection, an adapter must be used. The typical adapter used between a vehicle with a standard six wire electrical output connection and a trailer with a standard four wire electrical input connection receives electrical signals from the towing vehicle and transmits those signals to the trailer's tail lights.

Adapters currently on the market utilize the signals received from the towing vehicle as follows: when a turn signal is indicated, an intermittent signal is sent to the trailer, momentarily illuminating either the left or right tail light, as appropriate, and then extinguishing that tail light, in a repeating pattern for as long as the turn is being signaled. When the brakes are applied by the towing vehicle, a constant signal is sent to the trailer, illuminating both the left and right tail lights for the duration of time that the brakes are being applied. However, when both a turn is being signaled and the brakes are being applied—for example, when the towing vehicle is slowing in the process of making a turn—the brake signal receives priority and both tail lights are illuminated. Thus, the trailer's tail lights no longer indicate a turn when the brakes are being applied, even if a turn is intended. This may present an increased level of danger to a following vehicle as well as to the towing vehicle and trailer. Similarly, even when the towing vehicle uses a standard four wire electrical output connection and thus no adapter is needed, the signals sent to the trailer result in the same pattern: when both a turn is being signaled and the brakes are being applied the brake signal receives priority and both tail lights are illuminated.

There is thus demonstrated the need for an electrical adapter suitably configured to allow a standard vehicle six wire electrical output connection to be used with a standard trailer four wire electrical input connection which combines signals from the towing vehicle in a manner that allows the trailer's tail lights to display simultaneous braking and turning signals, as well as the need for an electrical converter suitably configured to allow a standard vehicle four wire electrical output connection to be used with a standard trailer four wire electrical input connection which combines signals from the towing vehicle in a manner that allows the trailer's tail lights to display simultaneous braking and turning signals.

It is therefore an object of the present invention to present an adapter suitably configured to allow a standard vehicle six wire electrical output connection to be used with a standard trailer four wire electrical input connection.

It is a further object of the present invention to present a converter suitably configured to allow a standard vehicle four wire electrical output connection to be used with a standard trailer four wire electrical input connection.

It is yet a further object of the present invention to present an adapter which combines signals received from a towing vehicle in a manner that allows a trailer's tail lights to display braking and turn signals independently.

It is yet a further object of the present invention to present a converter which combines signals received from a towing vehicle in a manner that allows a trailer's tail lights to display braking and turn signals independently.

It is yet a further object of the present invention to present an adapter which combines signals received from a towing vehicle in a manner that allows a trailer's tail lights to display braking and turn signals simultaneously.

It is yet a further object of the present invention to present a converter which combines signals received from a towing vehicle in a manner that allows a trailer's tail lights to display braking and turn signals simultaneously.

It is yet a further object of the present invention to present an adapter which is inexpensive to manufacture and simple to use.

It is yet a further object of the present invention to present an adapter which incorporates a pair of logic circuits to combine signals received from a towing vehicle appropriately for use by a trailer's tail lights.

It is yet a further object of the present invention to present a converter which incorporates a pair of logic circuits to combine signals received from a towing vehicle appropriately for use by a trailer's tail lights.

It is yet a further object of the present invention to present an adapter which incorporates a pair of logic circuits, one of which controls the illumination of the trailer's left tail light and the other of which controls the illumination of the trailer's right tail light.

It is yet a further object of the present invention to present a converter which incorporates a pair of logic circuits, one of which controls the illumination of the trailer's left tail light and the other of which controls the illumination of the trailer's right tail light.

It is yet a further object of the present invention to present an adapter which incorporates a pair of logic circuits integrated into a printed circuit board.

It is yet a further object of the present invention to present a converter which incorporates a pair of logic circuits integrated into a printed circuit board.

It is yet a further object of the present invention to present an adapter which incorporates a pair of logic circuits, each of which functions as an Exclusive OR ("XOR") gate to combine signals received from a towing vehicle.

It is yet a further object of the present invention to present a converter which incorporates a pair of logic circuits, each of which functions as an Exclusive OR ("XOR") gate to combine signals received from a towing vehicle.

It is yet a further object of the present invention to present an adapter which incorporates a pair of logic circuits, each of which comprises a quad NAND gate to perform the XOR function to combine signals received from a towing vehicle.

It is yet a further object of the present invention to present a converter which incorporates a pair of logic circuits, each of which comprises a quad NAND gate to perform the XOR function to combine signals received from a towing vehicle.

It is yet a further object of the present invention to present an adapter having a weather-proof housing.

Other objects of the present invention will be readily apparent from the description that follows.

SUMMARY OF THE INVENTION

The present invention discloses a device which may be embodied as either an electrical adapter configured to allow a towing vehicle's standard six wire electrical output connection to be used with a trailer's standard four wire electrical input connection, or an electrical converter configured to allow a towing vehicle's standard four wire electrical output connection to be used with a trailer's standard four wire electrical input connection, such that the towing vehicle's power supply can provide power to the trailer's tail lights and inputs controlling the towing vehicle's tail lights can also control the trailer's tail lights. The device combines input signals from the towing vehicle in a manner that results in the trailer's tail lights displaying all desired functions, including simultaneous braking and turning signals. This is achieved by the device incorporating a pair of logic circuits, one to control the illumination of the trailer's left tail light and one to control the illumination of the trailer's right tail light. The two logic circuits can receive six different input signals from the towing vehicle. Upon receipt of the input signals, the logic circuits control the tail lights as follows: a null signal (no brakes being applied, no turns being signaled) results in both tail lights being extinguished; a brake signal with no turn signal results in both tail lights being illuminated; a left turn signal with no brake signal results in the left tail light intermittently being illuminated and extinguished in a repeating pattern; a right turn signal with no brake signal results in the right tail light being intermittently illuminated and extinguished in a repeating pattern; a left turn signal with brake signal results in the left tail light being intermittently illuminated and extinguished in a repeating pattern and the right tail light being constantly illuminated; and a right turn signal with brake signal results in the right tail light being intermittently illuminated and extinguished in a repeating pattern and the left tail light being constantly illuminated. This pattern allows the tail lights to indicate both braking and a turn signal when both are active simultaneously.

Each of the two logic circuits of the device of the present invention receives only those input signals associated with either the left or right tail light, as well as the brake. Because the null signal and the brake only signal apply to both tail lights, these two signals are repeated for each logic circuit. The remaining four input signals are divided into a pair for the left tail light and a pair for the right tail light. Thus, each logic circuit processes four input signals, which are a combination of brake signal (on or off) and turn signal (on or off). Two inputs, one each associated with the brake signal and the respective turn signal, are present for each logic circuit. Each logic circuit then has an XOR gate to process the signals from the two inputs, resulting in a single output signal (on or off) for each tail light. The above described sequence of control of the tail lights is achieved by this configuration of inputs and the XOR gates in the logic circuits.

The logic circuits of the device may be integrated into a single printed circuit board. The family of required logic devices is well known. The necessary XOR logic gates must be capable of sustaining the operating battery voltage of an automobile. The XOR logic function may also be constructed from simple logic circuits capable of sustaining this voltage, for example the CD4093B quad NAND gate manufactured by Texas Instruments. (Four NAND—"Not AND"—gates in series, each receiving two inputs, can be configured to perform the XOR function.) In the embodiment of the device comprising an adapter the printed circuit board is encased in a weather-proof housing that has at each end the standard connection interfaces found on trailer adapters. That is, at one end is a round interface with six connection points, configured to be fit into the standard six wire electrical output connection of the towing vehicle, and on the other end of the adapter is a rectangular interface with four connection points, configured to be fit together with the standard four wire electrical input connection of the trailer. Wires within the housing run to and from the connection points of the interfaces and the printed circuit board. Alternatively, the device may be housed in a rectangular or other shaped enclosure and may be wired directly to the electrical circuitry of the towing vehicle and terminated in a standard four wire electrical output connector.

It is to be understood that the foregoing and following description of the invention are intended to be illustrative and exemplary rather than restrictive of the invention as claimed. These and other aspects, advantages, and features of the invention will become apparent to those skilled in the art after review of the entire specification, accompanying figures, and claims incorporated herein.

BRIEF DESCRIPTION OF THE DRAWINGS

FIG. 3A is a side schematic view of one embodiment of the device of the present invention being an adapter fitted between a standard six wire electrical output connection component that is mounted on a vehicle and a standard four wire electrical input connection component that is attached to a trailer.

FIG. 3B is a side schematic view of the embodiment of the device of the present invention depicted in FIG. 3A, with the adapter shown fully inserted into a standard six wire electrical output connection and a standard four wire electrical input connection inserted onto the adapter.

DETAILED DESCRIPTION OF THE INVENTION

Figure 1A:
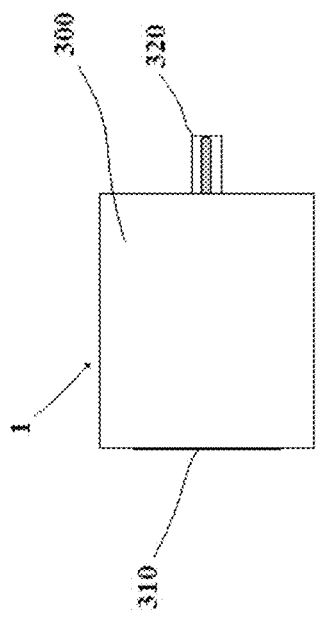
FIG. 1A is a side plan view of an embodiment of the device of the present invention being an adapter.
Figure 1C:
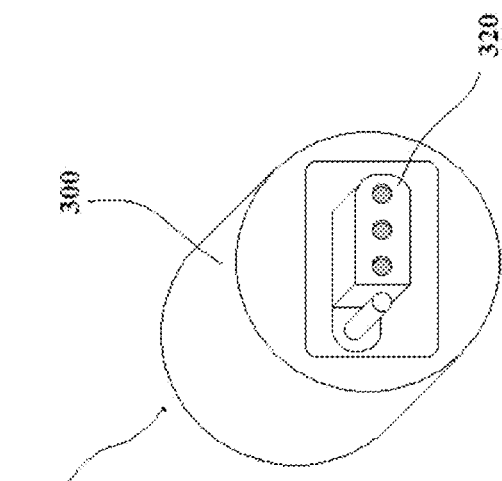
FIG. 1C is a rear perspective view of the embodiment of the device of the present invention depicted in FIG. 1A.
Figure 1B:
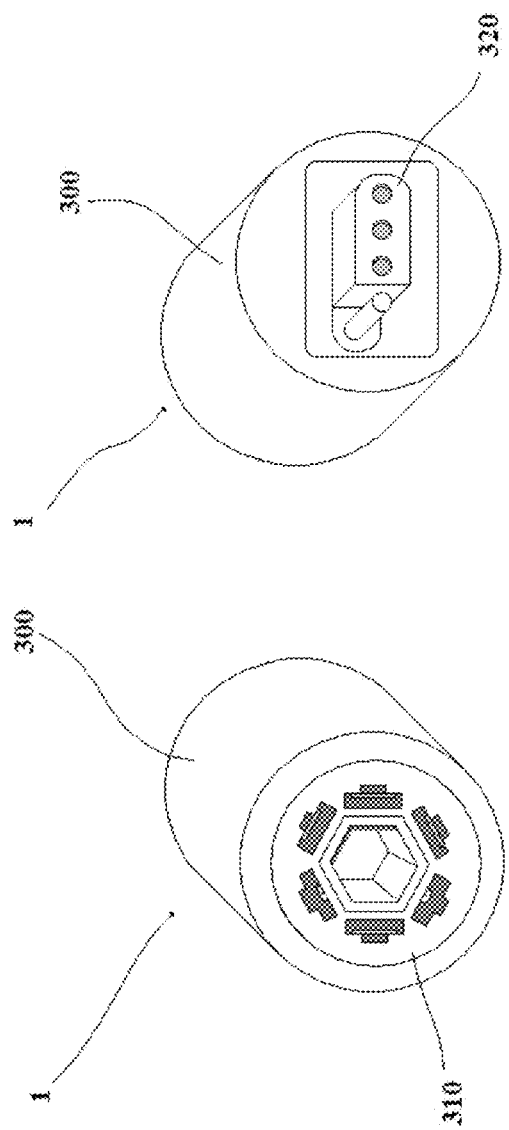
FIG. 1B is a front perspective view of the embodiment of the device of the present invention depicted in FIG. 1A.

The embodiment of the device of the present invention being an adapter 1 is configured to be interposed between a towing vehicle's 10 standard six wire electrical output connection 30 and a trailer's 20 standard four wire electrical input connection 40, see FIG. 3A, so as to allow the towing vehicle's 10 standard six wire electrical output connection 30 to be used with the trailer's 20 standard four wire electrical input connection 40 while providing for full simultaneous braking and turn signaling through the trailer's 20 tail lights 22. A standard six wire electrical output connection 30 typically found in towing vehicles 10 has a power wire, a ground wire, a running lights wire, a brake wire 36, a left signal wire 32, and a right signal wire 34. A standard four wire electrical input connection 40 typically found in trailers 20 has a ground wire, a running lights wire, a left brake signal wire 42, and a right brake signal wire 44. The present invention is concerned with providing a simple, inexpensive mechanism for combining the input signals from the brake wire 36 and left signal wire 32 of the six wire electrical output connection 30 into a single output to the left brake signal wire 42 of the four wire electrical input connection 40, and for combining the input signals from the brake wire 36 and right signal wire 34 of the six wire electrical output connection 30 into a single output to the right brake signal wire 44 of the four wire electrical input connection 40. The power wires, ground wires, and running light wires are in connection with each other in the usual manner as is known in the art.

Figure 4:
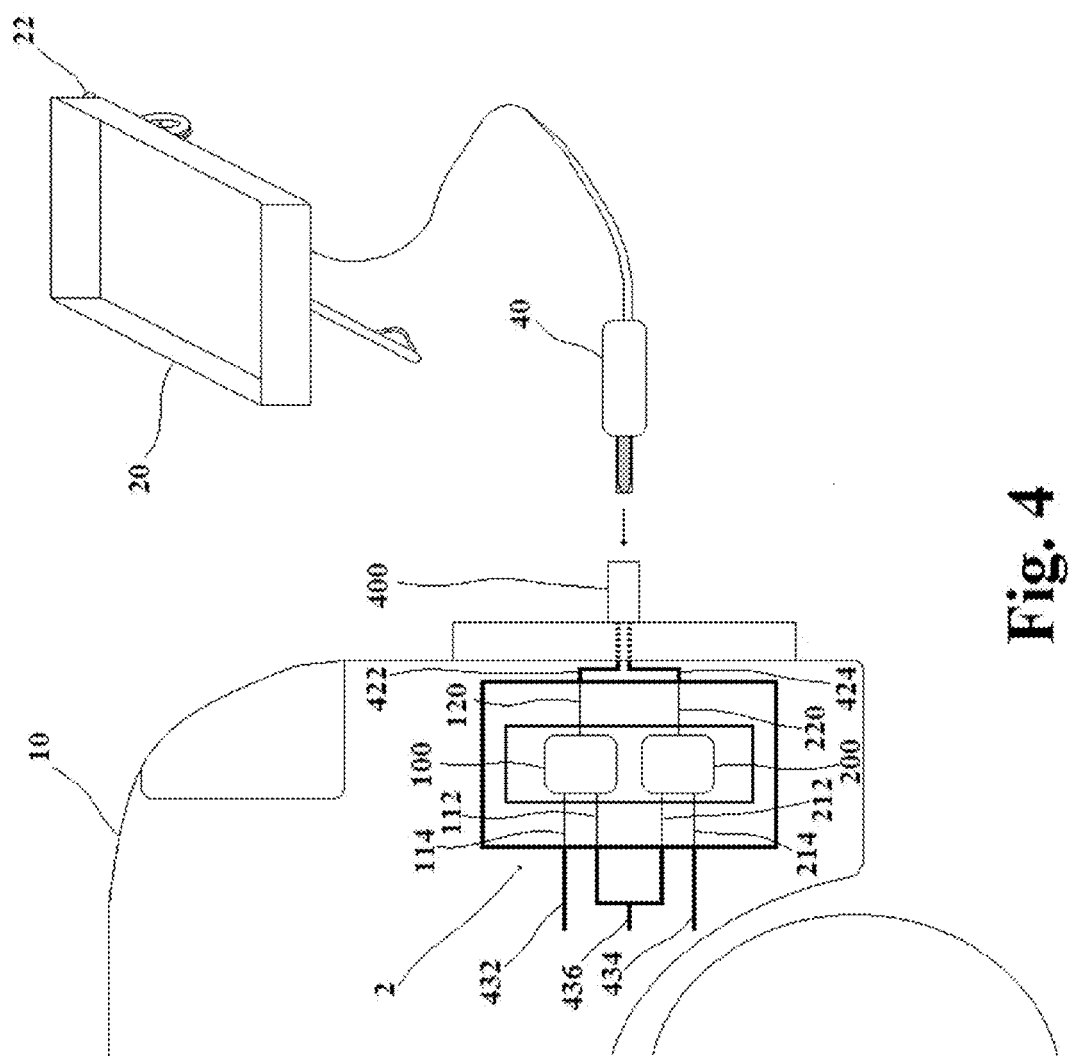
FIG. 4 is a side schematic view of another embodiment of the device of the present invention being a converter wired within a vehicle to a standard four wire electrical output connection component that is mounted on a vehicle for use with a standard four wire electrical input connection component that is attached to a trailer.

The embodiment of the device of the present invention being a converter 2 is configured to be placed within a towing vehicle 10 having a standard four wire electrical output connection 400 and wired thereto, see FIG. 4, so as to allow the towing vehicle's 10 standard four wire electrical output connection 400 to work properly with the trailer's 20 standard four wire electrical input connection 40, i.e., providing for full simultaneous braking and turn signaling through the trailer's 20 tail lights 22. A standard four wire electrical output connection 400 typically found in towing vehicles 10 has as inputs a left turn signal input 432, a right turn signal input 434, and a brake input 436, which are combined to provide the output signals of the standard four wire electrical output connection 400 through a ground wire, a running lights wire, a left brake signal wire, and a right brake signal wire, corresponding to the wires found on a standard four wire electrical input connection 40 typically found in trailers 20. That is, the left turn signal input 432 and the brake input 436 are combined to yield a left brake signal which is active whenever either the left turn signal or the brake is active, or both, and the right turn signal input 434 and the brake input 436 are combined to yield a right brake signal that is active whenever either the right turn signal or the brake is active, or both. The present invention is concerned with providing a simple, inexpensive mechanism for combining these input signals properly, such that the left turn signal input 432 and the brake input 436 are combined to yield a left brake signal which is active only when the left turn signal is active or the brake is active, but not when both are active, and the right turn signal input 434 and the brake input 436 are combined to yield a right brake signal that is active only when the right turn signal is active or the brake is active, but not when both are active.

Figure 5:
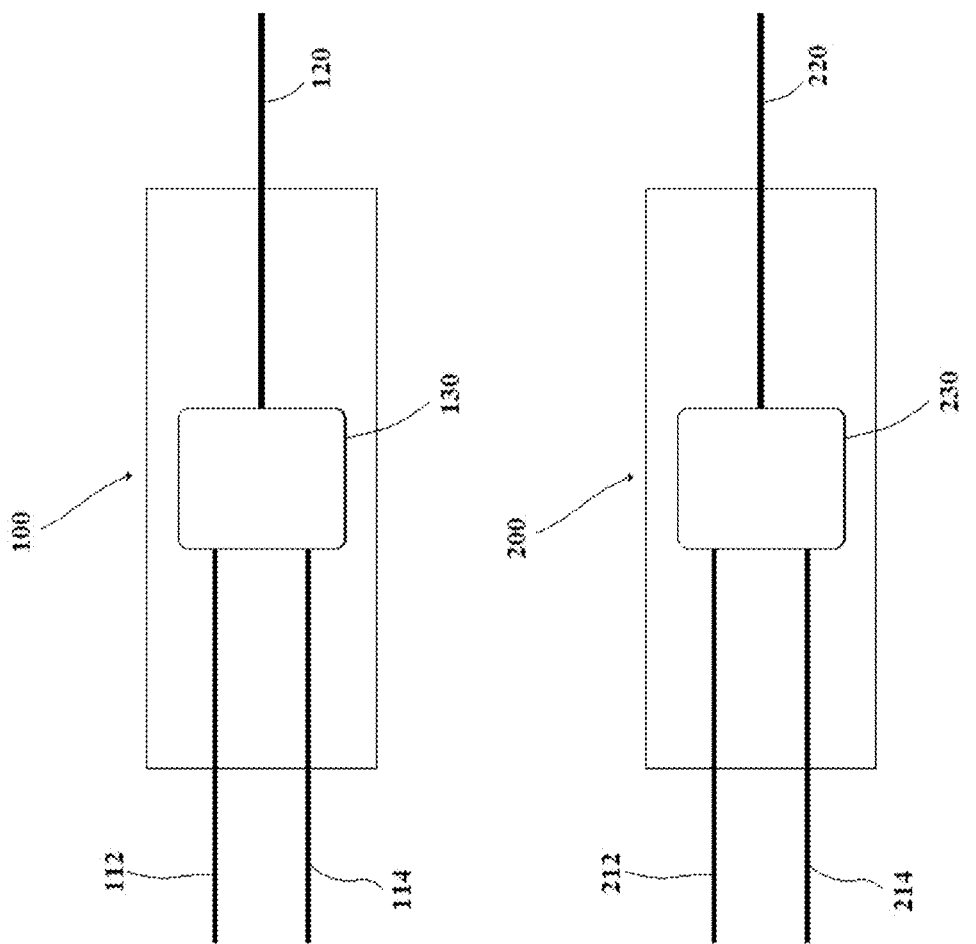
FIG. 5 is a schematic view of the first translator mechanism and the second translator mechanism, each having two input wires leading into a logic circuit and one output wire leading out of the logic circuit.

The device 1 of the present invention, in either the adapter 1 embodiment or the converter 2 embodiment, comprises a first translator mechanism 100 and a second translator mechanism 200. See FIG. 5. In the adapter 1 embodiment, the first translator mechanism 100 is suitably adapted to receive a first electrical input signal 142 from the brake wire 36 of the six wire electrical output connection 30 and a first electrical input signal 144 from the left signal wire 32 of the six wire electrical output connection 30. In the converter 2 embodiment, the first translator mechanism 100 is suitably adapted to receive a first electrical input signal 142 from the vehicle's 10 brake input wire 436 and a first electrical input signal 144 from the vehicle's 10 left turn signal input wire 432. In both embodiments, the first translator mechanism 100 then converts the first electrical input signals 142,144 into a first electrical output signal 150 which is provided to the left brake signal wire 42 of the four wire electrical input connection 40. Similarly, in the adapter 1 embodiment, the second translator mechanism 200 is suitably adapted to receive a second electrical input signal 242 from the brake wire 36 of the six wire electrical output connection 30 and a second electrical input signal 244 from the right signal wire 34 of the six wire electrical output connection 30, and in the converter 2 embodiment, the second translator mechanism 200 is suitably adapted to receive a second electrical input signal 242 from the vehicle's 10 brake input wire 436 and a second electrical input signal 244 from the vehicle's 10 right turn signal input wire 434. In both embodiments, the second translator mechanism 200 then converts the second electrical input signals 242,244 into a second electrical output signal 250 which is provided to the right brake signal wire 44 of the four wire electrical input connection 40.

In order for the first translator mechanism 100 to receive the first electrical input signals 142,144 as described above, the first translator mechanism 100 comprises a first left input wire 112 and a second left input wire 114. The first translator mechanism 100 also comprises a left output wire 120 to provide the first electrical output signal 150 to the left brake signal wire 42 of the four wire electrical input connection 40. In addition, the first translator mechanism 100 comprises a left logic circuit 130 to process the first electrical input signals. In the adapter 1 embodiment the first left input wire 112 is connected at one end to the brake wire 36 of the six wire electrical output connection 30 and at its other end to the left logic circuit 130, and is suitably adapted to carry the first electrical input signal 142 of the brake wire 36 of the six wire electrical output connection 30 to the left logic circuit 130. The second left input wire 114 is connected at one end to the left signal wire 32 of the six wire electrical output connection 30 and at its other end to the left logic circuit 130, and is suitably adapted to carry the first electrical input signal 144 of the left signal wire 32 of the six wire electrical output connection 30 to the left logic circuit 130. The left output wire 120 is connected at one end to the left logic circuit 130 and at its other end to the left brake signal wire 42 of the four wire electrical input connection 40, and is suitably adapted to carry the first electrical output signal 150 from the left logic circuit 130 to the left brake signal wire 42 of the four wire electrical input connection 40.

In the converter 2 embodiment, the first left input wire 112 is connected at one end to the vehicle's 10 brake input wire 436 and at its other end to the left logic circuit 130, and is suitably adapted to carry the first electrical input signal 142 of the vehicle's 10 brake input wire 436 to the left logic circuit 130. The second left input wire 114 is connected at one end to the vehicle's 10 left signal input wire 432 and at its other end to the left logic circuit 130, and is suitably adapted to carry the first electrical input signal 144 of the vehicle's 10 left signal input wire 432 to the left logic circuit 130. The left output wire 120 is connected at one end to the left logic circuit 130 and at its other end to the four wire electrical output connection's 400 left brake signal wire 422, which is in turn in connection with the left brake signal wire 42 of the four wire electrical input connection 40, and is suitably adapted to carry the first electrical output signal 150 from the left logic circuit 130 to the left brake signal wire 42 of the four wire electrical input connection 40. See FIG. 4.

The first left input wire 112, the second left input wire 114, and the left output wire 120 may be directly connected to the left logic circuit 130, as described above, or they may be indirectly connected, with intermediate connection means interposed therebetween. They may similarly be free standing wires, or integrated within a printed circuit board, or have any other suitable configuration. As contemplated by the present invention, these wires may be any appropriate conduit capable of carrying electrical signals and forming the connections described herein.

The left logic circuit 130 of the first translator mechanism 100 is capable of receiving the first electrical input signal 142 of the brake wire 36 of the six wire electrical output connection 30 and the first electrical input signal 144 of the left signal wire 32 of the six wire electrical output connection 30, as described above in the adapter 1 embodiment, or the first electrical input signal 142 of the vehicle's 10 brake input wire 436 and the vehicle's 10 left signal input wire 432, as described above in the converter 2 embodiment. It is further capable of producing the first electrical output signal 150 based on the first electrical input signals 142,144. Each first electrical input signal 142,144 is either a high signal or a low signal; likewise, the first electrical output signal 150 is either a high signal or a low signal. In the adapter 1 embodiment, the left logic circuit 130 produces a low first electrical output signal 150 when both the first electrical input signal 142 of the brake wire 36 of the six wire electrical output connection 30 and the first electrical input signal 144 of the left signal wire 32 of the six wire electrical output connection 30 are high signals. The left logic circuit 130 also produces a low first electrical output signal 150 when both the first electrical input signal 142 of the brake wire 36 of the six wire electrical output connection 30 and the first electrical input signal 144 of the left signal wire 32 of the six wire electrical output connection 30 are low signals. The left logic circuit 130 produces a high first electrical output signal 150 when the first electrical input signal 142 of the brake wire 36 of the six wire electrical output connection 30 is high and the first electrical input signal 144 of the left signal wire 32 of the six wire electrical output connection 30 is low. The left logic circuit 130 also produces a high first electrical output signal 150 when the first electrical input signal 142 of the brake wire 36 of the six wire electrical output connection 30 is low and the first electrical input signal 144 of the left signal wire 32 of the six wire electrical output connection 30 is high. This relationship may be described as an "exclusive or" relationship, where the first electrical output signal 150 is high only if the two first electrical input signals are of differing states; where the two first electrical input signals are of the same state (either both high or both low) the first electrical output signal 150 is low.

In the converter 2 embodiment, the left logic circuit 130 produces a low first electrical output signal 150 when both the first electrical input signal 142 of the vehicle's 10 brake input wire 436 and the first electrical input signal 144 of the vehicle's 10 left signal input wire 432 are high signals. The left logic circuit 130 also produces a low first electrical output signal 150 when both the first electrical input signal 142 of the vehicle's 10 brake input wire 436 and the first electrical input signal 144 of the vehicle's 10 left signal input wire 432 are low signals. The left logic circuit 130 produces a high first electrical output signal 150 when the first electrical input signal 142 of the vehicle's 10 brake input wire 436 is high and the first electrical input signal 144 of the vehicle's 10 left signal input wire 432 is low. The left logic circuit 130 also produces a high first electrical output signal 150 when the first electrical input signal 142 of the vehicle's 10 brake input wire 436 is low and the first electrical input signal 144 of the vehicle's 10 left signal input wire 432 is high. This relationship is likewise an "exclusive or" relationship.

In the preferred embodiment, the left logic circuit 130 comprises an XOR gate. The XOR gate receives two inputs and returns one output. If the two inputs are both high signals or both low signals, the XOR gate will produce a low signal output. If one input is a high signal and the other input is a low signal, the XOR gate will produce a high signal. In the most preferred embodiment, the XOR functionality of the left logic circuit 130 is achieved through the use of four NAND gates. See FIG. 6. Each NAND gate receives two inputs and returns one output. If the two inputs are both high signals, the NAND gate will produce a low signal output. If the two inputs are both low signals, or if one input is a high signal and the other input is a low signal, the NAND gate will produce a high signal. Combined in series, the four NAND gates perform the XOR functionality described above. An example of four NAND gates configured to perform XOR functionality is the Texas Instrument® CD4093B quad NAND gate printed circuit. Other manufacturers also produce quad NAND gates which can perform the XOR functionality.

Figure 6:
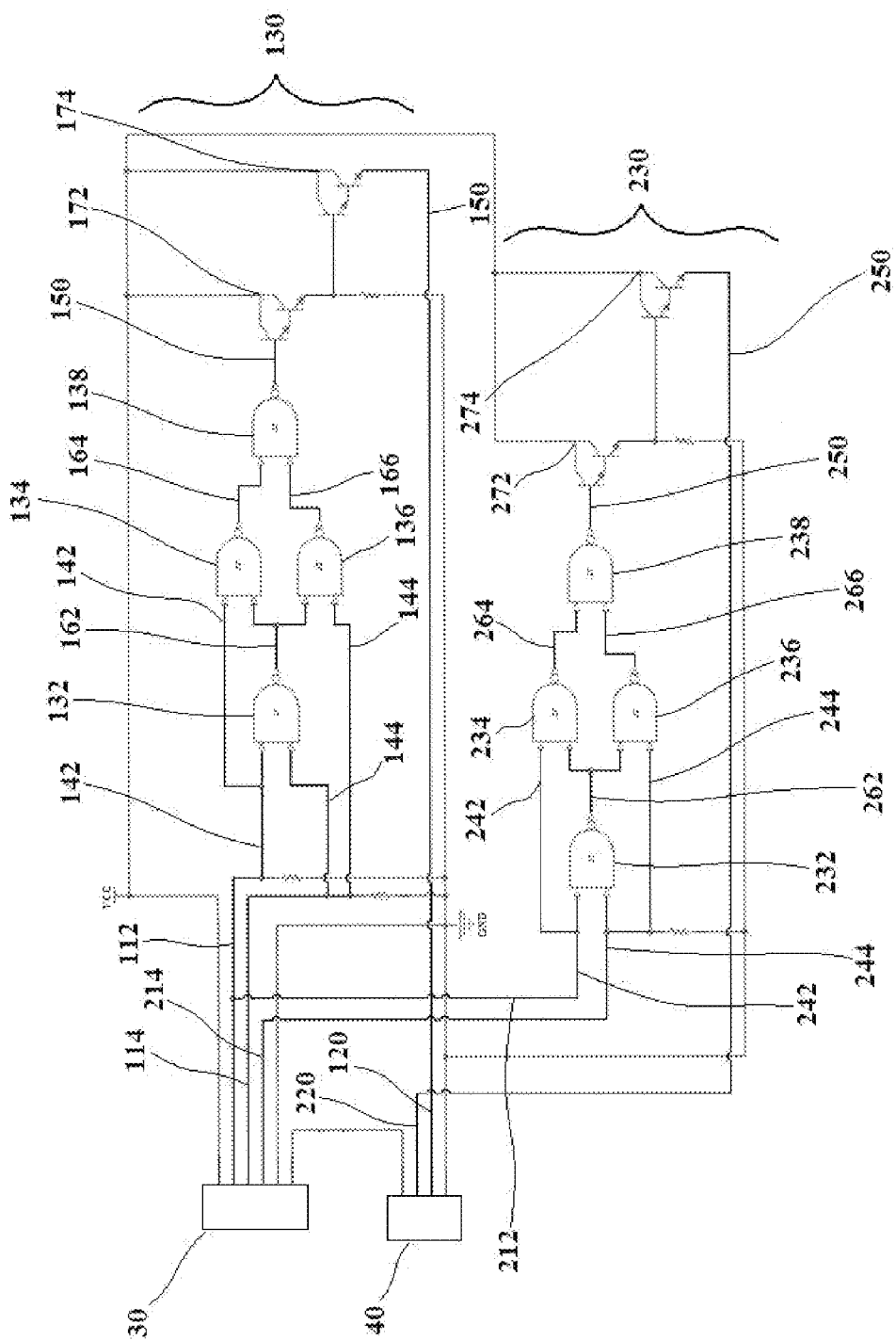
FIG. 6 is a circuit diagram of one embodiment of the left and right logic circuits, with the XOR functions comprised of 4 NAND gates.

Specifically, as shown in FIG. 6, in the adapter 1 embodiment, the first NAND gate 132 of the left logic circuit 130 receives as inputs the first electrical input signal 142 of the brake wire 36 of the six wire electrical output connection 30 and the first electrical input signal 144 of the left signal wire 32 of the six wire electrical output connection 30. It outputs a first intermediate electrical output signal 162. The second NAND gate 134 receives as inputs the first electrical input signal 142 of the brake wire 36 of the six wire electrical output connection 30 and the first intermediate electrical output signal 162. It outputs a second intermediate electrical output signal 164. The third NAND gate 136 receives as inputs the first electrical input signal 144 of the left signal wire 32 of the six wire electrical output connection 30 and the first intermediate electrical output signal 162. It outputs a third intermediate electrical output signal 166. The fourth NAND gate 138 receives as inputs the second intermediate electrical output signal 164 and the third intermediate electrical output signal 166. It outputs the first electrical output signal.

In the converter 2 embodiment, the first NAND gate 132 of the left logic circuit 130 receives as inputs the first electrical input signal 142 of the vehicle's 10 brake input wire 436 and the first electrical input signal 144 of the vehicle's 10 left signal input wire 432. It outputs a first intermediate electrical output signal 162. The second NAND gate 134 receives as inputs the first electrical input signal 142 of the vehicle's 10 brake input wire 436 and the first intermediate electrical output signal 162. It outputs a second intermediate electrical output signal 164. The third NAND gate 136 receives as inputs the first electrical input signal 144 of the vehicle's 10 left signal input wire 432 and the first intermediate electrical output signal 162. It outputs a third intermediate electrical output signal 166. The fourth NAND gate 138 receives as inputs the second intermediate electrical output signal 164 and the third intermediate electrical output signal 166. It outputs the first electrical output signal.

The second translator mechanism 200 is configured much the same as the first translator mechanism 100, with the following differences: instead of a first left input wire 112, a second left input wire 114, and a left output wire 120, the second translator mechanism 200 comprises a first right input wire 212, a second right input wire 214, and a right output wire 220. In the adapter 1 embodiment these wires carry a second electrical input signal 242 from the brake wire 36 of the six wire electrical output connection 30, a second electrical input signal 244 from the right signal wire 34 of the six wire electrical output connection 30, and a second electrical output signal 250 to the four wire electrical input connection 40, respectively. In the converter 2 embodiment these wires carry a second electrical input signal 242 from the vehicle's 10 brake input wire 436, a second electrical input signal 244 from the vehicle's 10 right signal input wire 434, and a second electrical output signal 250 to the four wire electrical output connection 400 for use by the four wire electrical input connection 40, respectively. These wires are configured identically to first left input wire 112, the second left input wire 114, and the left output wire 120. Each second electrical input signal 242,244 is either a high signal or a low signal; likewise, the second electrical output signal 240 is either a high signal or a low signal. The second translator mechanism 200 also comprises a right logic circuit 230 to process the second electrical input signals. In the adapter 1 embodiment the first right input wire 212 is connected at one end to the brake wire 36 of the six wire electrical output connection 30 and at its other end to the right logic circuit 230. The second right input wire 214 is connected at one end to the right signal wire 34 of the six wire electrical output connection 30 and at its other end to the right logic circuit 230. The right output wire 220 is connected at one end to the right logic circuit 230 and at its other end to the right brake signal wire 44 of the four wire electrical input connection 40. In the converter 2 embodiment the first right input wire 212 is connected at one end to the vehicle's 10 brake input wire 436 and at its other end to the right logic circuit 230. The second right input wire 214 is connected at one end to the vehicle's 10 right signal input wire 434 and at its other end to the right logic circuit 230. The right output wire 220 is connected at one end to the right logic circuit 230 and at its other end to the four wire electrical output connection's 400 right brake signal wire 424, which is in turn in connection with the right brake signal wire 44 of the four wire electrical input connection 40. See FIG. 4.

The first right input wire 212, the second right input wire 214, and the right output wire 220 may be directly connected to the right logic circuit 230, as described above, or they may be indirectly connected, with intermediate connection means interposed therebetween, as in the case of the wires associated with the left logic circuit 130, and may be similarly configured.

The right logic circuit 230 is configured substantially the same as the left logic circuit 130. In the preferred embodiments, the XOR function is performed by 4 NAND gates. The right logic circuit 230 comprises four NAND gates as described above. Thus, as shown in FIG. 6, in the adapter 1 embodiment, the first NAND gate 232 of the right logic circuit 230 receives as inputs the second electrical input signal 242 of the brake wire 36 of the six wire electrical output connection 30 and the second electrical input signal 244 of the right signal wire 34 of the six wire electrical output connection 30. It outputs a first intermediate electrical output signal 262. The second NAND gate 234 of the right logic circuit 230 receives as inputs the second electrical input signal 242 of the brake wire 36 of the six wire electrical output connection 30 and the first intermediate electrical output signal 262. It outputs a second intermediate electrical output signal 264. The third NAND gate 236 of the right logic circuit 230 receives as inputs the second electrical input signal 244 of the right signal wire 34 of the six wire electrical output connection 30 and the first intermediate electrical output signal 262. It outputs a third intermediate electrical output signal 266. The fourth NAND gate 238 of the right logic circuit 230 receives as inputs the second intermediate electrical output signal 264 and the third intermediate electrical output signal 266. It outputs the second electrical output signal.

In the converter 2 embodiment, the first NAND gate 232 of the right logic circuit 230 receives as inputs the second electrical input signal 242 of the vehicle's 10 brake input wire 436 and the second electrical input signal 244 of the vehicle's 10 right signal input wire 434. It outputs a first intermediate electrical output signal 262. The second NAND gate 234 of the right logic circuit 230 receives as inputs the second electrical input signal 242 of the vehicle's 10 brake input wire 436 and the first intermediate electrical output signal 262. It outputs a second intermediate electrical output signal 264. The third NAND gate 236 of the right logic circuit 230 receives as inputs the second electrical input signal 244 of the vehicle's 10 right signal input wire 434 and the first intermediate electrical output signal 262. It outputs a third intermediate electrical output signal 266. The fourth NAND gate 238 of the right logic circuit 230 receives as inputs the second intermediate electrical output signal 264 and the third intermediate electrical output signal 266. It outputs the second electrical output signal.

Many inexpensive XOR gate circuits cannot directly handle the amount of electrical voltage necessary to properly power a tail light lamp 22, and therefore in the preferred embodiments of the present invention each logic circuit 130, 230 is connected to a switch 172 which controls the voltage to the tail light lamp 22. See FIG. 6. A high first electrical output signal 150 from the left logic circuit 130 opens the switch 172 and allows power to be provided to the left tail light lamp, illuminating it. A low first electrical output signal 150 from the left logic circuit 130 closes the switch 172 and prevents power from being provided to the left tail light lamp, extinguishing it. Similarly, a high second electrical output signal 250 from the right logic circuit 230 opens a switch 272 and allows power to be provided to the right tail light lamp, and a low second electrical output signal 250 from the right logic circuit 230 closes the switch 272 and prevents power from being provided to the right tail light lamp. In the most preferred embodiments, each logic circuit 130,230 is connected to a pair of switches in series. See FIG. 6. A high first electrical output signal 150 from the left logic circuit 130 opens the first switch 172, which then opens the second switch 174, allowing power to be provided to the left tail light lamp. A low first electrical output signal 150 from the left logic circuit 130 closes the first switch 172, which then closes the second switch 174, preventing power to be provided to the left tail light lamp. Likewise, a high second electrical output signal 250 from the right logic circuit 230 opens the first switch 272, which then opens the second switch 274, allowing power to be provided to the right tail light lamp, and a low second electrical output signal 250 from the right logic circuit 230 closes the first switch 272, which then closes the second switch 274, preventing power to be provided to the right tail light lamp. The switches may be electromechanical relays, or transistors such as a Darlington transistors, or the like. Additional switches may also be used in series, though care must be taken to not unduly reduce the voltage needed to power the tail light lamps 22.

The adapter 1 embodiment of the present invention may also contain the first translator mechanism 100 and the second translator mechanism 200 within a weather-proof housing 300. See FIGS. 1A, 1B, 1C, and 3A. This housing 300 may be made of a plastic material or other non-conducting material. In the preferred embodiment the housing 300 is configured the same as standard six-wire-to-four-wire adapters known in the art. As such, the housing 300 contains a first interface 310 at one end and a second interface 320 at the opposite end.

The first interface 310 is suitably adapted to make an electrical connection with the six wire electrical output connection 30. The first left input wire 112 of the first translator mechanism 100, the second left input wire 114 of the first translator mechanism 100, the first right input wire 212 of the second translator mechanism 200, and the second right input wire 214 of the second translator mechanism 200 are connected to the first interface 310, and the first interface 310 permits an electrical connection between the first left input wire 112 of the first translator mechanism 100 and the brake wire 36 of the six wire electrical output connection 30, between the second left input wire 114 of the first translator mechanism 100 and the left signal wire 32 of the six wire electrical output connection 30, between the first right input wire 212 of the second translator mechanism 200 and the brake wire 36 of the six wire electrical output connection 30, and between the second right input wire 214 of the second translator mechanism 200 and the right signal wire 34 of the six wire electrical output connection 30.

The second interface 320 is suitably adapted to make an electrical connection with the four wire electrical input connection 40. The left output wire 120 of the first translator mechanism 100 and the right output wire 220 of the second translator mechanism 200 are connected to the second interface 320, and the second interface 320 permits an electrical connection between the left output wire 120 of the first translator mechanism 100 and the left brake signal wire 42 of the four wire electrical input connection 40, and between the right output wire 220 of the second translator mechanism 200 and the right brake signal wire 44 of the four wire electrical input connection 40.

The physical connections between the first interface 310 and the first left input wire 112 of the first translator mechanism 100, the second left input wire 114 of the first translator mechanism 100, the first right input wire 212 of the second translator mechanism 200, and the second right input wire 214 of the second translator mechanism 200 may be direct, or the wires may be indirectly connected, with intermediate connection means interposed therebetween. They may similarly be free standing wires, or integrated within a printed circuit board, or have any other suitable configuration. As contemplated by the present invention, these wires may be any appropriate conduit capable of carrying electrical signals and forming the connections described herein. Similarly, the physical connections between the left output wire 120 of the first translator mechanism 100 and the second interface 320 and the right output wire 220 of the second translator mechanism 200 and the second interface 320 may be direct, or the wires may be indirectly connected, with intermediate connection means interposed therebetween.

Figure 2B:
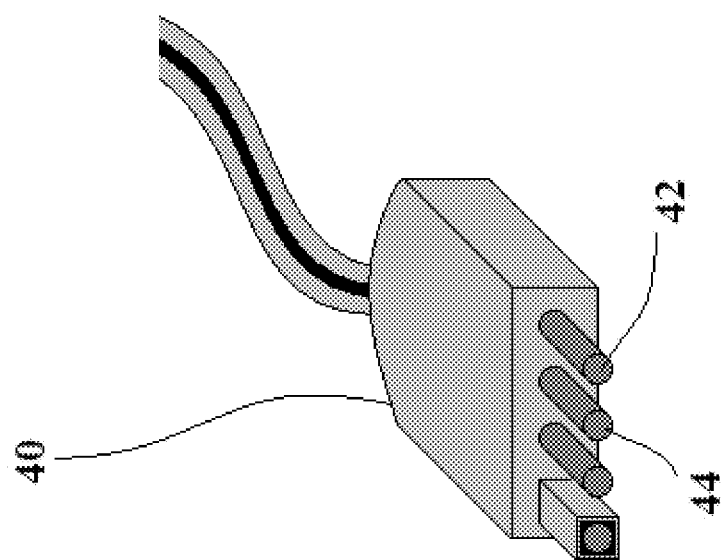
FIG. 2B is a perspective view of a standard four wire electrical input connection component that may be found attached to a trailer.
Figure 2A:
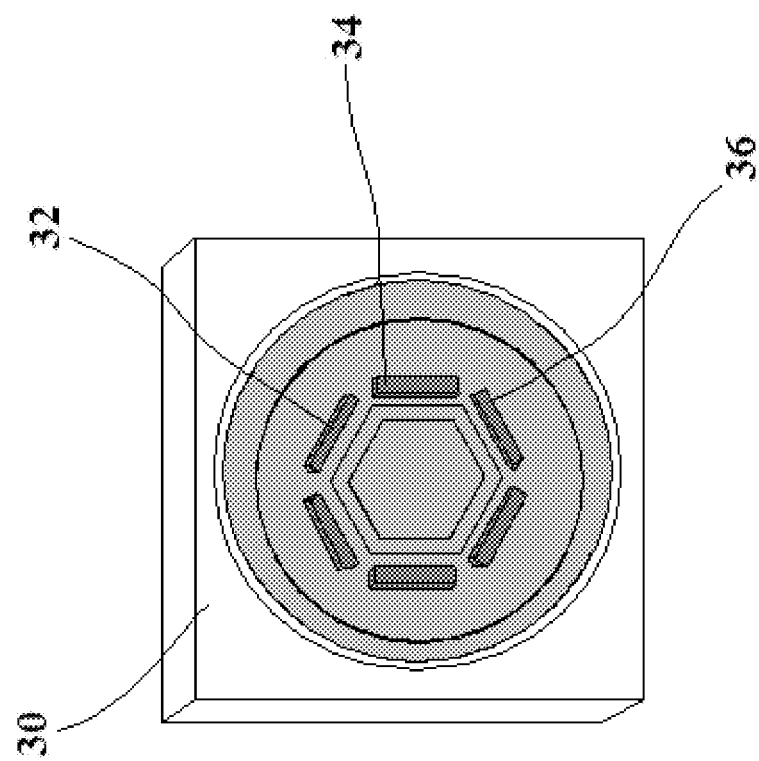
FIG. 2A is a perspective view of a standard six wire electrical output connection component that may be found mounted on a vehicle.

The physical connection between the first interface 310 and the six wire electrical output connection 30 is contemplated to be any physical connection means known in the art and used with standard adapters. In one embodiment the first interface 310 has six substantially flat metallic contact plates recessed in depressions formed into the adapter, see FIG. 1B, each aligned with one of six substantially flat metallic contact plates arrayed within the six wire electrical output connection 30 and extending therefrom, see FIG. 2A. Likewise, the physical connection between the second interface 320 and the four wire electrical input connection 40 is contemplated to be any physical connection means known in the art and used with standard adapters. In one embodiment the second interface 320 has three receptacles and one pin extending outward, see FIG. 1C, with each receptacle aligned with a corresponding pin extending outward from the four wire electrical input connection 40 and the pin of the second interface 320 aligned with a corresponding receptacle located on the four wire electrical input connection 40, see FIG. 2B. When so configured, the first interface 310 of the adapter 1 may be inserted into the six wire electrical output connection 30 and a four wire electrical input connection 40 is inserted onto the second interface 40 of the adapter 1. See FIG. 3B.

The converter 2 embodiment of the present invention may contain the first translator mechanism 100 and the second translator mechanism 200 within a housing located within the vehicle 10. See FIG. 4. This housing 300 may be made of a plastic material or other non-conducting material. In the preferred embodiment the housing 300 is located proximate to the four wire electrical output connection 400 for easier wiring.

Modifications and variations can be made to the disclosed embodiments of the present invention without departing from the subject or spirit of the invention as defined in the following claims.

I claim:

1. A device for use with a vehicle capable of generating a brake signal, a left turn signal, and a right turn signal, and with a trailer having a left lamp, a right lamp, and a four wire electrical input connection, whereby the four wire electrical input connection includes a ground wire, a running lights wire, a left brake signal wire, and a right brake signal wire, with the left brake signal wire in connection with the left lamp and the right brake signal wire in connection with the right lamp, said device comprising a first translator mechanism suitably adapted to receive a first left electrical input signal corresponding to the brake signal of the vehicle and a second left electrical input signal corresponding to the left turn signal of the vehicle and to convert said left electrical input signals by use of a left logic circuit into a left electrical output signal to be provided to the left brake signal wire of the four wire electrical input connection, wherein the left logic circuit comprises four NAND gates, whereby the first NAND gate directly receives as inputs the first left electrical input signal and the second left electrical input signal and outputs a first left intermediate electrical output signal, the second NAND gate directly receives as inputs the first left electrical input signal and the first left intermediate electrical output signal and outputs a second left intermediate electrical output signal, the third NAND gate directly receives as inputs the second left electrical input signal and the first left intermediate electrical output signal and outputs a third left intermediate electrical output signal, and the fourth NAND gate directly receives as inputs the second left intermediate electrical output signal and the third left intermediate electrical output signal and outputs the left electrical output signal, and a second translator mechanism suitably adapted to receive a first right electrical input signal corresponding to the brake signal of the vehicle and a second right electrical input signal corresponding to the right turn signal of the vehicle and to convert said right electrical input signals by use of a right logic circuit into a right electrical output signal to be provided to the right brake signal wire of the four wire electrical input connection,
   wherein the right logic circuit comprises four NAND gates,
      whereby the first NAND gate directly receives as inputs the first right electrical input signal and the second right electrical input signal and outputs a first right intermediate electrical output signal,
      the second NAND gate directly receives as inputs the first right electrical input signal and the first right intermediate electrical output signal and outputs a second right intermediate electrical output signal,
      the third NAND gate directly receives as inputs the second right electrical input signal and the first right intermediate electrical output signal and outputs a third right intermediate electrical output signal, and
      the fourth NAND gate directly receives as inputs the second right intermediate electrical output signal and the third right intermediate electrical output signal and outputs the right electrical output signal,
   whereby the left electrical output signal is directly provided to the left brake signal wire of the four wire electrical input connection and said left electrical output signal determines whether the left lamp is illuminated or extinguished, and
   the right electrical output signal is directly provided to the right brake signal wire of the four wire electrical input connection and said right electrical output signal determines whether the right lamp is illuminated or extinguished.

2. The device of claim 1 wherein the first translator mechanism further comprises a first left input wire, a second left input wire, and a left output wire,
   whereby the first left input wire is suitably adapted to receive the first left electrical input signal and is in connection with the left logic circuit, and is suitably adapted to carry the first left electrical input signal to the left logic circuit,
   the second left input wire is suitably adapted to receive the second left electrical input signal and is in connection with the left logic circuit, and is suitably adapted to carry the second left electrical input signal to the left logic circuit, and
   the left output wire is suitably adapted to carry the left electrical output signal from the left logic circuit to the left brake signal wire of the four wire electrical input connection.

3. The device of claim 2 wherein the left logic circuit is capable of receiving the first left electrical input signal and the second left electrical input signal and is further capable of producing the left electrical output signal based on the left electrical input signals,
   whereby each left electrical input signal is either a high signal or a low signal and the left electrical output signal is either a high signal or a low signal,
   with the left logic circuit producing a low left electrical output signal when the first left electrical input signal is high and the second left electrical input signal is high,
   the left logic circuit producing a low left electrical output signal when the first left electrical input signal is low and the second left electrical input signal is low,
   the left logic circuit producing a high left electrical output signal when the first left electrical input signal is high and the second left electrical input signal is low, and
   the left logic circuit producing a high left electrical output signal when the first left electrical input signal is low and the second left electrical input signal is high.

4. The device of claim 1 wherein the second translator mechanism comprises a first right input wire, a second right input wire, and a right output wire,
   whereby the first right input wire is suitably adapted to receive the first right electrical input signal and is in connection with the right logic circuit, and is suitably adapted to carry the first right electrical input signal to the right logic circuit,
   the second right input wire is suitably adapted to receive the second right electrical input signal and is in connection with the right logic circuit, and is suitably adapted to carry the second right electrical input signal to the right logic circuit, and
   the right output wire is suitably adapted to carry the right electrical output signal from the right logic circuit to the right brake signal wire of the four wire electrical input connection.

5. The device of claim 4 wherein the right logic circuit is capable of receiving the first right electrical input signal and the second right electrical input signal and is further capable of producing the right electrical output signal based on the right electrical input signals,
   whereby each right electrical input signal is either a high signal or a low signal and the right electrical output signal is either a high signal or a low signal,
   with the right logic circuit producing a low right electrical output signal when the first right electrical input signal is high and the second right electrical input signal is high,
   the right logic circuit producing a low right electrical output signal when the first right electrical input signal is low and the second right electrical input signal is low,
   the right logic circuit producing a high right electrical output signal when the first right electrical input signal is high and the second right electrical input signal is low, and
   the right logic circuit producing a high right electrical output signal when the first right electrical input signal is low and the second right electrical input signal is high.

6. The device of claim 1 being an electrical adapter wherein the vehicle has a six wire electrical output connection, with the six wire electrical output connection including a power wire, a ground wire, a running lights wire, a brake wire, a left signal wire, and a right signal wire,
   wherein the brake signal generated by the vehicle is carried by the brake wire, the left turn signal generated by the vehicle is carried by the left signal wire, and the right turn signal generated by the vehicle is carried by the right signal wire,
   the first translator mechanism is suitably adapted to receive the first left electrical input signal corresponding to the brake signal of the vehicle from the brake wire of the six wire electrical output connection and the second left electrical input signal corresponding to the left turn signal of the vehicle from the left signal wire of the six wire electrical output connection, and
   the second translator mechanism is suitably adapted to receive the first right electrical input signal corresponding to the brake signal of the vehicle from the brake wire of the six wire electrical output connection and the second right electrical input signal corresponding to the right turn signal of the vehicle from the right signal wire of the six wire electrical output connection.

7. The device of claim 6 wherein the first translator mechanism further comprises a first left input wire, a second left input wire, and a left output wire,
whereby the first left input wire is in connection with the brake wire of the six wire electrical output connection and with the left logic circuit, and is suitably adapted to carry the first left electrical input signal from the brake wire of the six wire electrical output connection to the left logic circuit,
the second left input wire is in connection with the left signal wire of the six wire electrical output connection and with the left logic circuit, and is suitably adapted to carry the second left electrical input signal from the left signal wire of the six wire electrical output connection to the left logic circuit, and
the left output wire is in connection with the left brake signal wire of the four wire electrical input connection, and is suitably adapted to carry the left electrical output signal from the left logic circuit to the left brake signal wire of the four wire electrical input connection.

8. The device of claim 6 wherein the first translator mechanism and the second translator mechanism are contained within a weather-proof housing.

9. The device of claim 8 wherein
the housing contains a first interface and a second interface,
the first translator mechanism comprises a first left input wire, a second left input wire, and a left output wire, and
the second translator mechanism comprises a first right input wire, a second right input wire, and a right output wire,
with the first interface being suitably adapted to make an electrical connection with the six wire electrical output connection and the second interface being suitably adapted to make an electrical connection with the four wire electrical input connection,
whereby the first left input wire of the first translator mechanism is in connection with the first interface and the first interface permits an electrical connection between the first left input wire of the first translator mechanism and the brake wire of the six wire electrical output connection,
the second left input wire of the first translator mechanism is in connection with the first interface and the first interface permits an electrical connection between the second left input wire of the first translator mechanism and the left signal wire of the six wire electrical output connection,
the first right input wire of the second translator mechanism is in connection with the first interface and the first interface permits an electrical connection between the first right input wire of the second translator mechanism and the brake wire of the six wire electrical output connection,
the second right input wire of the second translator mechanism is in connection with the first interface and the first interface permits an electrical connection between the second right input wire of the second translator mechanism and the right signal wire of the six wire electrical output connection,
the left output wire of the first translator mechanism is in connection with the second interface and the second interface permits an electrical connection between the left output wire of the first translator mechanism and the left brake signal wire of the four wire electrical input connection, and
the right output wire of the second translator mechanism is in connection with the second interface and the second interface permits an electrical connection between the right output wire of the second translator mechanism and the right brake signal wire of the four wire electrical input connection.

10. The device of claim 6 wherein the adapter is removably attachable to the vehicle.

11. The device of claim 6 wherein the adapter is integrated with and fixedly attached to the vehicle.

12. The device of claim 1 being an electrical converter wherein the vehicle has a brake input wire, a left turn input wire, a right turn input wire, and a four wire electrical output connection, with the four wire electrical output connection including a ground wire, a running lights wire, a left brake signal wire, and a right signal wire,
wherein the brake signal generated by the vehicle is carried by the brake input wire, the left turn signal generated by the vehicle is carried by the left turn input wire, and the right turn signal generated by the vehicle is carried by the right turn input wire,
the first translator mechanism is suitably adapted to receive the first left electrical input signal corresponding to the brake signal of the vehicle from the brake input wire and the second left electrical input signal corresponding to the left turn signal of the vehicle from the left turn input wire of the vehicle and to provide the left electrical output signal to the left brake signal wire of the four wire electrical output connection of the vehicle for use by the four wire electrical input connection of the trailer, and
the second translator mechanism is suitably adapted to receive the first right electrical input signal corresponding to the brake signal of the vehicle from the brake input wire and the second right electrical input signal corresponding to the right turn signal of the vehicle from the right turn input wire of the vehicle and to provide the right electrical output signal to the right brake signal wire of the four wire electrical output connection of the vehicle for use by the four wire electrical input connection of the trailer.

13. The device of claim 12 wherein the first translator mechanism further comprises a first left input wire, a second left input wire, and a left output wire,
whereby the first left input wire is in connection with the brake input wire of the vehicle and with the left logic circuit, and is suitably adapted to carry the first left electrical input signal of the brake input wire of the vehicle to the left logic circuit,
the second left input wire is in connection with the left turn input wire of the vehicle and with the left logic circuit, and is suitably adapted to carry the second left electrical input signal of
the left turn input wire of the vehicle to the left logic circuit, and the left output wire is in connection with the left brake signal wire of the four wire electrical output connection of the vehicle, and is suitably adapted to carry the left electrical output signal from the left logic circuit to the left brake signal wire of the four wire electrical output connection of the vehicle for use by the four wire electrical input connection of the trailer.

14. The device of claim 12 wherein the converter is integrated with and fixedly attached to the vehicle.

* * * * *